(12) United States Patent
Kudo

(10) Patent No.: US 8,327,920 B2
(45) Date of Patent: Dec. 11, 2012

(54) HEAT ACCUMULATOR WITH INSULATED DOUBLE TUBE STRUCTURE

(75) Inventor: Tomohide Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 950 days.

(21) Appl. No.: 12/365,435

(22) Filed: Feb. 4, 2009

(65) Prior Publication Data

US 2009/0194250 A1    Aug. 6, 2009

(30) Foreign Application Priority Data

Feb. 4, 2008    (JP) .................................. 2008-024079

(51) Int. Cl.
*F28D 17/00*    (2006.01)
(52) U.S. Cl. .............. 165/10; 165/4; 122/31.1; 215/309
(58) Field of Classification Search .............. 165/4, 10; 220/563, 562, 601, 661; 122/18.1, 31.1, 122/33; 215/309; 392/465, 477, 484, 485, 392/487–494, 495, 496, 441–445, 449–453, 392/461
See application file for complete search history.

(56) References Cited

U.S. PATENT DOCUMENTS

| | | | | |
|---|---|---|---|---|
| 2,272,108 A | * | 2/1942 | Bradley | 432/30 |
| 2,369,526 A | * | 2/1945 | Brandl | 392/450 |
| 3,717,748 A | * | 2/1973 | Imler | 392/471 |
| 3,773,031 A | * | 11/1973 | Laing et al. | 126/400 |

FOREIGN PATENT DOCUMENTS

| | | |
|---|---|---|
| JP | H05-25254 | 4/1993 |
| JP | 5-80817 | 11/1993 |
| JP | 7-12767 | 3/1995 |
| JP | 2004-317044 | 11/2004 |

OTHER PUBLICATIONS

Drawings—Figures 2-3 of Japanese Reference JP54025550.*
Drawings—Figure 1 of Japanese Reference JP59122893.*

* cited by examiner

*Primary Examiner* — Cheryl J Tyler
*Assistant Examiner* — Orlando E Aviles Bosques
(74) *Attorney, Agent, or Firm* — Rankin, Hill & Clark LLP

(57) ABSTRACT

A heat accumulator includes a thermally insulated heat storage vessel having an opening formed in a bottom wall thereof, a quantity of heat accumulating medium arranged within the vessel, and a fluid circulation tube of double tube structure inserted from the opening into the vessel and extending vertically upward toward a top wall of the vessel for introducing a fluid into the vessel or discharging the fluid out of the vessel. The heat accumulator further includes a heat-insulating layer provided on an outer peripheral surface of the fluid circulation tube and extending over at least a longitudinal portion of the fluid circulation tube extending from the bottom wall of the vessel in an upward direction to a predetermined height of the vessel.

12 Claims, 7 Drawing Sheets

HEAT ACCUMULATOR WITH INSULATED DOUBLE TUBE STRUCTURE

FIELD OF THE INVENTION

The present invention relates to a heat accumulator for absorbing and storing heat from a fluid while the fluid is at an elevated temperature and releasing heat to the fluid when the fluid is cold.

BACKGROUND OF THE INVENTION

A typical example of the heat accumulator of the type concerned is a hot water heat accumulator disclosed in, for example, Japanese Utility Model Laid-open Publication (JP-UM-A) No. 5-25254.

As shown in FIG. 8 hereof, the disclosed hot water heat accumulator 100 includes an outer vessel 101 and an inner vessel 103 disposed in the outer vessel 101 with a vacuum part 102 interposed between the outer and inner vessels 101 and 103. The heat accumulator 100 further includes an inlet pipe 104 for introducing water into the inner vessel 103, a plurality of heat transfer tubes 106 embedded in a heat storage material 105 for the passage therethrough of the water which is introduced from the inlet pipe 104, and an outlet pipe 107 for discharging water out of the hot water heat accumulator 100 after the water has passed through the heat transfer tubes 106.

With the hot water heat accumulator 100 thus arranged, while the water held within the inner vessel 103 is at a high or elevated temperature, the heat storage material 105 absorbs and stores thermal energy from the water.

Alternatively, while the water held within the inner vessel 103 is cold, the heat storage material 105 releases heat to the water to thereby warm the water inside the inner vessel 103.

The most part of the interior of the hot water heat accumulator 100 is surrounded by the vacuum part 102 so that heat dissipation from the inside to the outside of the hot water heat accumulator 100 can be avoided. However, since a portion of the inlet pipe 104 projecting outwardly from the outer vessel 101 is free from thermal insulation, the inlet pipe 104 can form a thermal passage, allowing heat to dissipate or leak from the inside to the outside of the hot water heat accumulator 100. With this heat dissipation, a temperature drop will occur at an area indicated by phantom lines 108 shown in FIG. 8, leading to reduction of heat retention property of the hot water heat accumulator 100 caused due to an undesired internal temperature drop. Similarly, the outlet pipe 107 can also form a thermal passage and allows heat to dissipate or leak from the inside to the outside of the hot water heat accumulator 100. This may cause a temperature drop to occur at an area indicated by phantom lines 108 shown in FIG. 8, which will lower the heat retention property of the hot water heat accumulator 100 due to an undesired internal temperature drop.

Thus, the conventional hot water heat accumulator has a room to improve the heat-retention property.

SUMMARY OF THE INVENTION

With the foregoing drawbacks of the prior art in view, an object of the present invention is to provide a heat accumulator with improved heat-retention property.

According to the present invention, there is provided a heat accumulator comprising a thermally insulated heat storage vessel having a top wall, a bottom wall and an opening formed in the bottom wall, a quantity of heat accumulating medium arranged within the vessel, and a fluid circulation tube of double tube structure inserted from the opening of the bottom wall into the vessel and extending vertically upward toward the top wall of the vessel for introducing a fluid into the vessel or discharging the fluid out of the vessel. The heat accumulator further comprising a heat-insulating layer provided on an outer peripheral surface of the fluid circulation tube and extending over at least a longitudinal portion of the fluid circulation tube extending from the bottom wall of the vessel in an upward direction to a predetermined height of the vessel.

By thus providing the heat-insulating layer to the fluid circulation tube, it is possible to minimize heat dissipation or leakage from the opening of the vessel, thereby improving the heat-retention property of the heat accumulator.

The heat accumulator is operable to perform a heat-retaining operation in which the heat accumulating medium releases heat to the fluid to thereby keep an internal temperature of the vessel at a constant value. During the heat-retaining operation of the heat accumulator, the fluid circulation tube provided with the heat-insulating layer is capable of forming temperature stratification in which a body of the fluid held within the fluid circulation tube is arranged into three horizontal layers of different temperatures. The three horizontal layers consist of a top layer of a first temperature which is substantially equal to the internal temperature of the vessel, a bottom layer which is lower than the first temperature and substantially equal to the outside temperature, and an intermediate mixed layer disposed between the top and bottom layers and having an average temperature which is intermediate between the first and second temperatures. The longitudinal portion of the fluid circulation tube, which is provided with the heat-insulating layer, contains only the bottom layer and the intermediate mixed layer. By virtue of the low-temperature bottom layer formed within the fluid circulation tube, heat dissipation or leakage from the fluid circulation tube can be limited to a very low level and, hence, the heat accumulator has an improved degree of heat-retention property.

The heat-insulating layer may be provided to extend over the entire length of the fluid circulation tube. In one preferred form of the invention, the heat-insulating layer comprises a vacuum layer provided between the outer peripheral surface of the fluid circulation tube and a hollow cylindrical inner wall of the vessel extending from the bottom wall toward the top wall of the vessel. The heat-insulating layer may be a layer of heat-insulating material.

Preferably, the heat accumulator further includes a support member mounted to connect the fluid circulation tube to the vessel. The support member may be mounted to connect an upper end of the fluid circulation tube to the vessel. The thus provided support member functions to release load or stress acting on the fluid circulation tube and eventually increases the rigidity of the fluid circulation tube.

The support member preferably has an upper surface facing the top wall of the vessel, a lower surface facing the heat accumulating medium, and a number of through-holes extending between the upper and lower surfaces and held in fluid communication with the fluid circulation tube. The support member formed with the through-holes serves also as a baffle plate that regulates the flow of the fluid. The heat accumulator may further include an extension tube, which extends from an inner tube of the fluid circulation tube of double tube structure toward the bottom wall of the vessel across the thickness of the support member. By thus providing the extension tube, it is possible to supply the fluid deeper into the vessel and circulate the fluid through the entire height of a mass of the heat accumulating medium received inside the vessel. With this circulation of the fluid, it is possible to increase the heat transfer efficiency between the heat accumulating medium and the fluid.

In one preferred form of the invention, the heat accumulating medium is contained in a spherical capsule, and the spherical capsule has an outside diameter larger than an inside diameter of the through-holes of the support member and smaller than inside diameters of the inner tube of the fluid circulation tube and the extension tube. By thus dimensioning the spherical capsule, it is possible for the heat accumulator to be assembled and installed without capsulated heat accumulating medium. In such case, the capsules each containing the heat accumulating medium are supplied into the vessel of the heat insulator which has been installed in a desired system.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
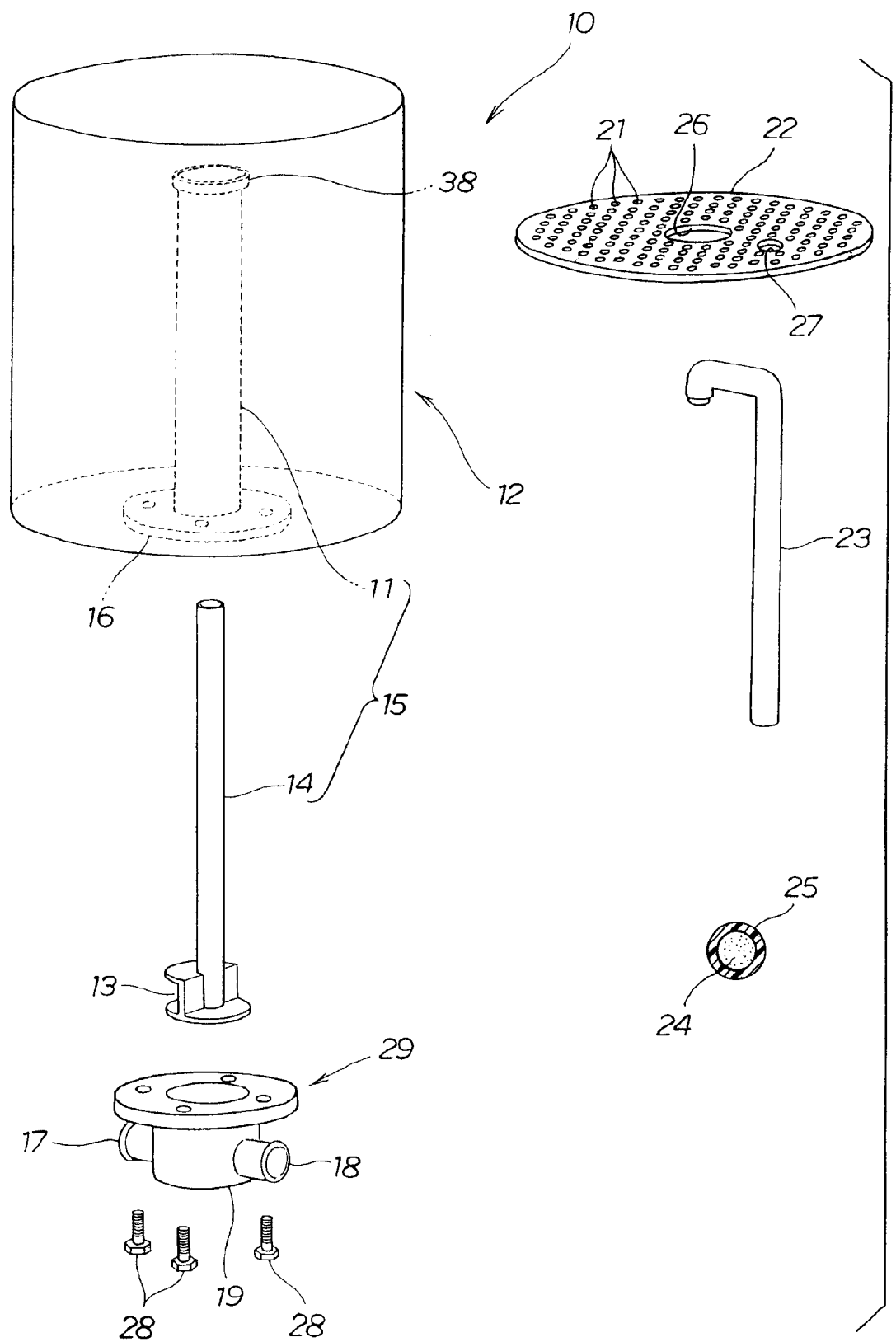
FIG. 1 is an exploded perspective view of a heat accumulator according to a first embodiment of the present invention.
Figure 2:
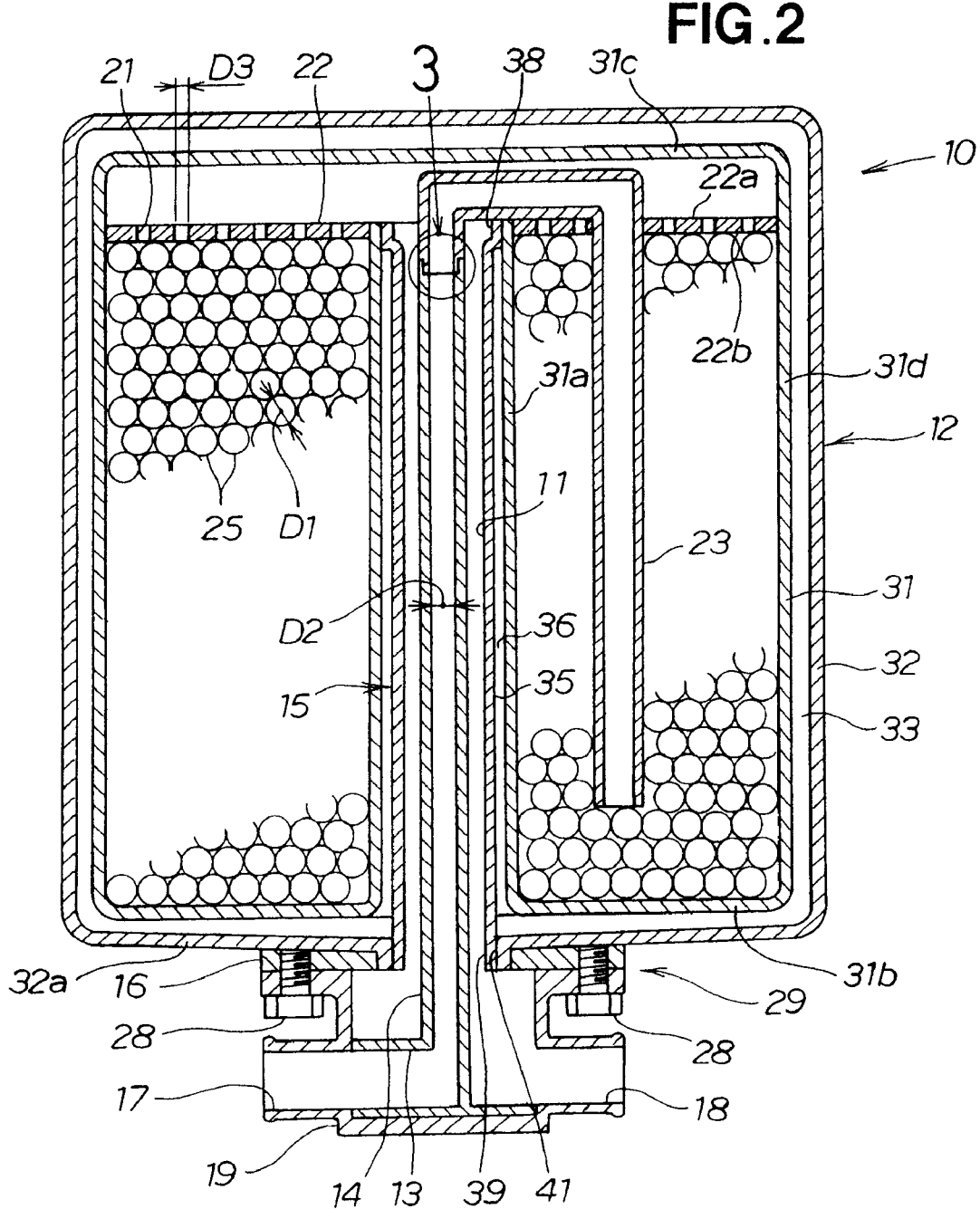
FIG. 2 is a vertical cross-sectional view of the heat accumulator.

Referring now to the drawings and FIGS. 1 and 2 in particular, there is shown a heat accumulator 10 according to a first embodiment of the present invention. The heat accumulator 10 generally comprises a thermally-insulated heat storage vessel 12, and a fluid circulation tube 15 of double tube structure including an outer tube 11 and an inner tube 14 disposed concentrically with each other within the vessel 12 (see FIG. 2) so that a heat transfer medium such as water can be introduced into the vessel 12 via the inner tube 14 and discharged out of the vessel 12 via the outer tube 11. The heat accumulator further includes a pipe joint unit 29 attached to a bottom wall of the vessel 12 for connection with a piping system (not shown) and having a fluid inlet 17 and a fluid outlet 18 that are connected to respective lower ends of the outer and inner tubes 11 and 14, and a support member 22 of ring-like configuration mounted to connect an upper end of the fluid circulation tube 15 to the vessel 12 and having a number of through-holes 21 for the passage of the heat transfer medium. The heat accumulator also includes an L-shaped extension tube 23 supported by the support member 22 together with the outer tube 11 and extending contiguously from an upper end of the inner tube 14 to a lower part of an internal space of the vessel 12, and a number of capsules 25 containing therein a heat accumulating medium 24 and filled in a heat storage space or chamber defined within the vessel 12.

The ring-shaped support member 22 has a central hole 26 and a guide hole 27 offset from the central hole 26 in a radial direction of the support member 22 so that the L-shaped extension tube 23 can pass through the holes 26 and 27. The support member 22 having the through-holes 21 serves also as a baffle plate that regulates the flow of the heat transfer medium.

The pipe joint unit 29 includes a first joint member 16 attached by welding, for example, to the bottom wall of the vessel 12 and a second joint member 19 connected to the first joint member 16 by a plurality of screws 28 so as to complete the pipe joint unit 29. The inner tube 14 of the fluid circulation tube 15 has an inlet opening 13 formed at the lower end thereof and facing in a radial outward direction of the inner tube 14. The lower end of the inner tube 14 is received in the pipe joint unit 29 so that the inlet opening 13 is directly connected to the fluid inlet 17. Thus, lower end of the fluid circulation tube 15 is connected to the vessel 12 via the pipe joint unit 29. The upper end of the fluid circulation tube 15 is connected to vessel 12 via the support member 22. The thus provided support member 22 operates to release a load or pressure acting on the fluid circulation tube 15 and thus increases the rigidity of the fluid circulation tube 15.

As shown in FIG. 2, the thermally-insulated heat storage vessel 12 is a vacuum vessel composed of an inner vessel 31 and an outer vessel 32 surrounding the inner vessel 31 with a vacuum layer 33 interposed between the inner and outer vessels 31 and 32. The vacuum layer 33 is formed by vacuum evacuation of a gap or space between the inner and outer vessels 31, 32. With the vacuum layer 33 thus provided, the inner vessel 31 is thermally insulated.

The inner vessel 31 has a hollow cylindrical inner wall 31a extending from a bottom wall 31b toward a top wall 31c and terminating short of the top wall 31c. The outer vessel 32 has an opening 41 formed in a bottom wall 32a in concentric relation to the cylindrical inner wall 31a of the inner vessel 31. The opening 41 has an inside diameter smaller than an inside diameter of the cylindrical inner wall 31a. The outer tube 11 of the fluid circulation tube 15 is secured at an upper end 38 thereof to an upper end of the inner wall 31a of the inner vessel 31 and, at a lower end 39 thereof, to a peripheral edge of the opening 41. With this arrangement, there is formed a vacuum layer (heat insulating layer) 36 provided between an outer peripheral surface 35 and the inner wall 31a of the inner vessel 31. In the illustrated embodiment, the heat-insulating layer 36 is provided to extend over substantially the entire length of the outer tube 11 of the fluid circulation tube 15.

The ring-shaped support member 22 is fitted in a space defined between the upper end of the inner wall 31a of the inner vessel 31 and a horizontally aligned upper portion of an outer wall 31d of the inner vessel 31 so as to define between the support member 22 and the inner vessel 31 a heat storage space or chamber in which the spherical capsules 25 containing therein the heat accumulating medium 24 are received. The support member 22 has an upper surface 22a facing the top wall 31c of the inner vessel 31 and a lower surface 22b facing a mass of the encapsulated heat accumulating medium 24 and held in fluid communication of the fluid circulation tube 15. The heat accumulating medium 24 preferably comprises a latent heat accumulating material such as paraffin, sodium acetate trihydrate, or erythritol that may be provided in a form which is impregnated in a porous material and encapsulated or coated with a synthetic resin.

The spherical capsules 25 containing the heat accumulating medium 24 have an outside diameter D1, which is set to be smaller than inside diameters D2 of the inner tube 14 and the extension tube 23 and larger than an inside diameter D3 of the through-holes 21 of the support member 22. The thus dimensioned capsules 25 can be supplied successively through the inner tube 11 and the extension tube 23 into the heat storage chamber defined between the inner vessel 31 and the support member 22. It is, therefore, possible to assemble and install the heat insulator 10 without capsules 25 and supply the capsules 25 into the heat accumulator 10 after completion of the installation of the heat accumulator 10 in a desired system. Thus, assembly and installation of the heat accumulator 10 can be achieved easily and efficiently.

Figure 3:
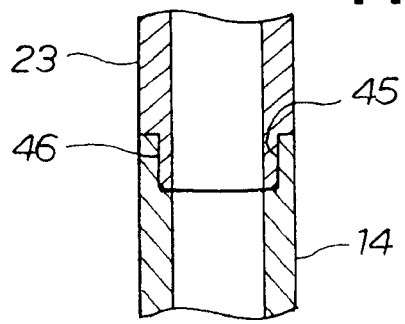
FIG. 3 is an enlarged view of a portion indicated by a circle 3 shown in FIG. 2.

As shown in FIG. 3, the inner tube 14 has a cylindrical recess 45 formed at an upper end thereof, and the L-shaped extension tube 23 has a cylindrical projection 46 formed at one end (upper end in FIG. 2) thereof. The recess 45 in the inner tube 14 and the projection 46 on the extension tube 23 are fitted with each other to firmly join together the inner tube 14 and the extension tube 23.

Figure 4:
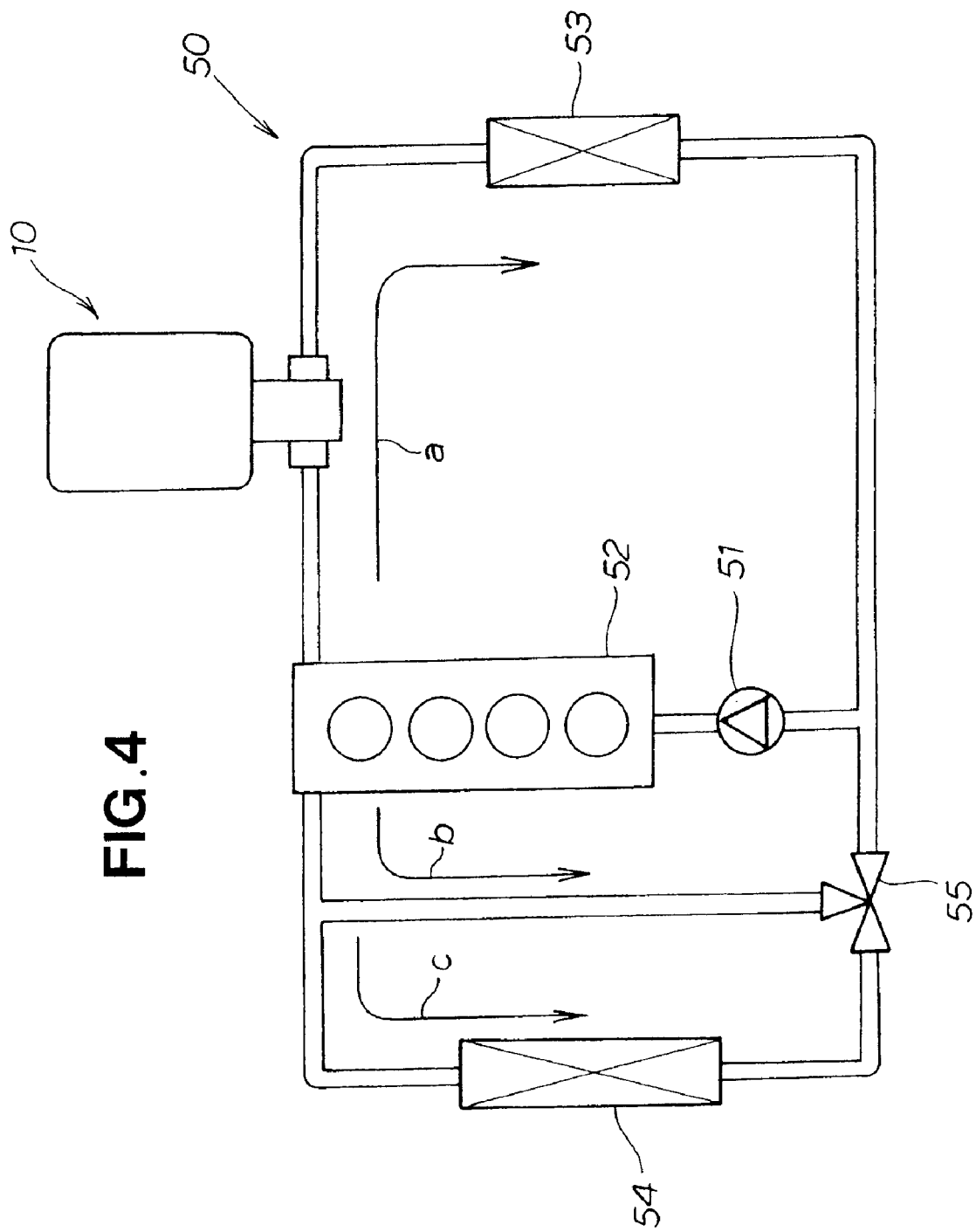
FIG. 4 is a diagrammatical view of a vehicular engine cooling water circulation system or circuit in which the heat accumulator of the invention is incorporated.

Operation of the heat accumulator 10 of the foregoing construction will be described in conjunction with a vehicular engine cooling water circulation system or circuit 50 shown in FIG. 4. The engine cooling water circulation circuit 50 includes a pump 51 drivable by an engine 52 to circulate a cooling medium (cooling water) through the circuit 50, the engine 52 adapted to be cooled by the cooling water driven by the pump 51, the heat accumulator 10 disposed between the engine 52 and a heater core 53 for introducing the cooling water from the engine 52 and supplying the cooling water to the heater core 53, and a thermostat 55 disposed between the engine 52 and a radiator 54 and arranged to control the flow of the cooling water such that when the cooling water warmed by the engine 52 is at a temperature below a predetermined threshold value. The cooling water flows to bypasses the radiator 54, and when the temperature of the cooling water rises to the predetermined threshold value, the cooling water warmed by the engine 52 is circulated to the radiator 54.

While the engine 52 is running, the cooling water is forced by the pump 51 to circulate through the engine 52 to thereby cool the engine 52. Then, a part of the engine cooling water is circulated to flow from the engine 52 through the heat accumulator 10 to the heater core 53 and returns to the pump 51, as indicated by the arrow "a" shown FIG. 4. The remaining part of the engine cooling water warmed by the engine 52 is circulated to either bypass the radiator 54 as indicated by the arrow "b" shown in FIG. 4, or pass through the radiator 54 as indicated by the arrow "c" shown in FIG. 4 before it returns to the pump 51 via the thermostat 55. The circulation path indicated by the arrow "b" or the circulation path indicated by the arrow "c" is selected by the operation of the thermostat 55 depending on a temperature of the engine cooling water.

Especially, when the temperature of the engine cooling water is below the predetermined threshold value, the thermostat 55 operates to circulate the cooling water through the path indicated by the arrow "b". When the temperature of the engine cooling water rises to the predetermined threshold value, this means that the engine cooling water requires cooling and, hence, the thermostat 55 operates to circulate the cooling water through the path indicated by the arrow "c". When the engine 52 is stopped, the pump 51 is deactivated to thereby terminate circulation of the fluid through the circuit 50.

Figure 5:
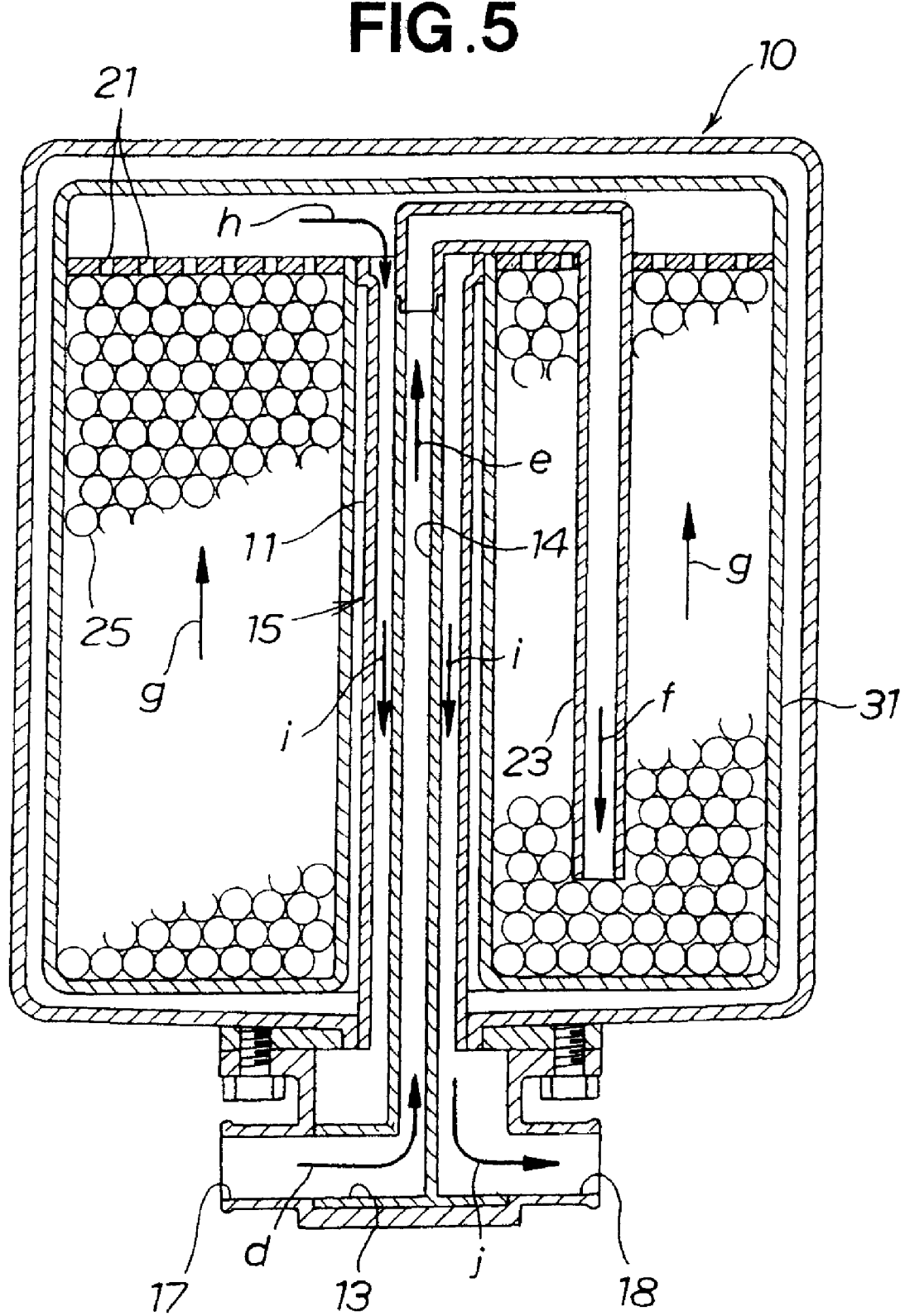
FIG. 5 is a view similar to FIG. 2, but showing an operation of the heat accumulator when an engine of the engine cooling water circulation circuit is running.

As shown in FIG. 5, while the engine 52 (FIG. 4) is running, the cooling water warmed by the engine 52 flows from the fluid inlet 17 into the heat accumulator 10. The cooling water introduced in the heat accumulator 10 enters from the inlet opening 13 into the inner tube 14 as indicated by the arrow "d" and flows upward through the inner tube 14, as indicated by the arrow "e". At the upper end of the inner tube 14, the cooling water is introduced into the L-shaped extension tube 23 where it flows first in an upward direction, then in a horizontal direction and finally in a downward direction as indicated by the arrow "f". At a lower end of the L-shaped extension pipe 23, the cooling water is discharged into the heat storage chamber of the inner vessel 31 filled with the capsules 25 and flows upward across the height of the heat storage chamber as indicated by the arrow "g". Because of a lower outlet end of the extension tube 23 located near the bottom wall 31b of the inner vessel 31, it is possible to supply the fluid deeper into the vessel and circulate the fluid through the entire height of a mass of the heat accumulating medium 24 received inside the vessel 31. With this circulation of the fluid, it is possible to increase the heat transfer efficiency between the heat accumulating medium 24 and the fluid. Then, the cooling water passes through the through-holes 21 of the support member 22 in an upward direction and flows into the outer tube 11 from the upper end thereof, as indicated by the arrow "h". Subsequently, the cooling water flows downward through the outer tube 11 as indicated by the arrow "i", and finally the cooling water is discharged from the fluid outlet 18 to the outside of the heat accumulator 10, as indicated by the arrow "j".

With this circulation of the cooling water, while the engine 52 (FIG. 4) is running, the heat accumulator 10 operates to perform a heat-accumulating operation in which the heat accumulating medium 24 contained in the capsules 25 absorbs and stores heat from the engine cooling water warmed by the engine 52 as the engine cooling water passes through the heat accumulator 10.

When the engine 52 (FIG. 4) stops running, the heat accumulator 10 operates to perform a heat-retaining operation in which the heat accumulating medium 24 contained in the capsules 25 releases latent heat to the fluid to thereby keep an internal temperature of the inner vessel 31 at a constant value. More particularly, when the engine 52 stops running, the pump 51 is deactivated and circulation of the engine cooling water through the circuit 50 is terminated. As time passes, the temperature of the engine cooling water while being held in contact with the capsules 25 approaches a melting point of the heat accumulating medium 24 and the heat accumulating medium 24 starts releasing heat to the engine cooling water. At the same time, by virtue of a convection flow caused due to a temperature difference between the engine cooling water and the heat accumulating medium 24, the internal temperature of the inner vessel 31 becomes substantially constant throughout the entire region of the inner vessel 31.

Figure 6A:
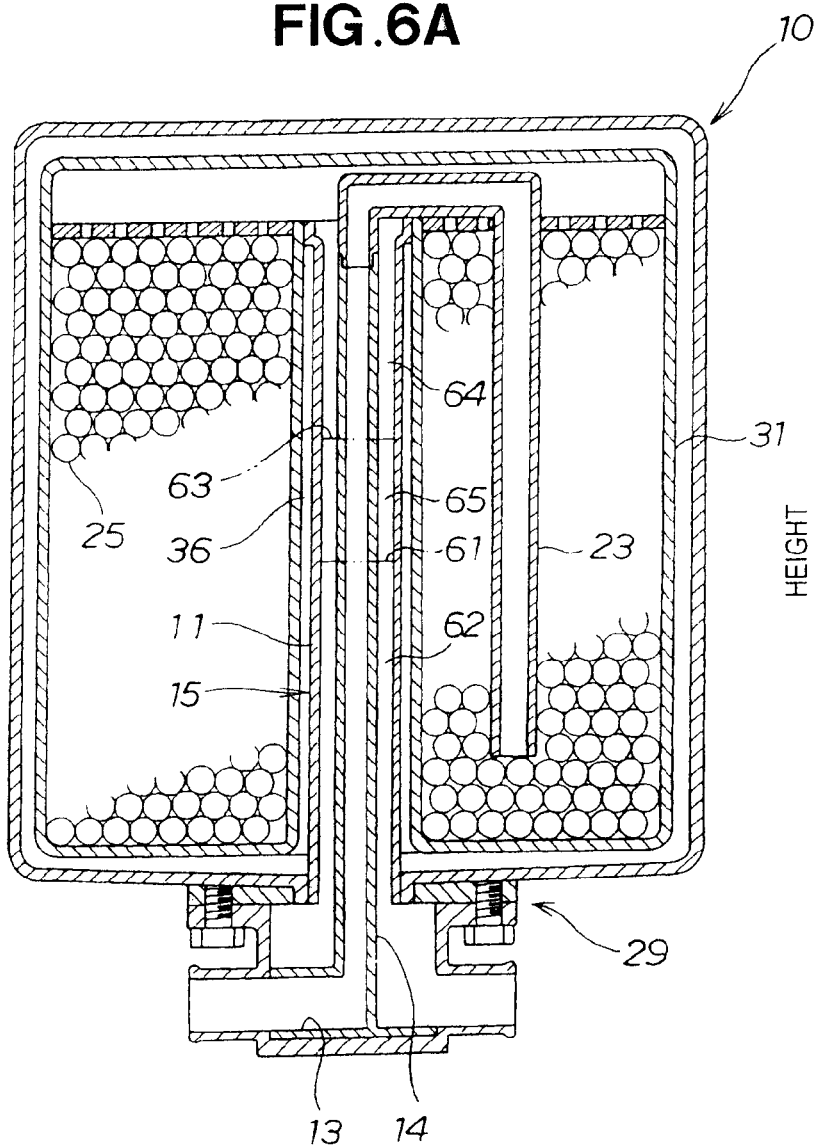
FIG. 6A is a view similar to FIG. 2, but showing an operation of the heat accumulator when operation of the engine is stopped.
Figure 6B:
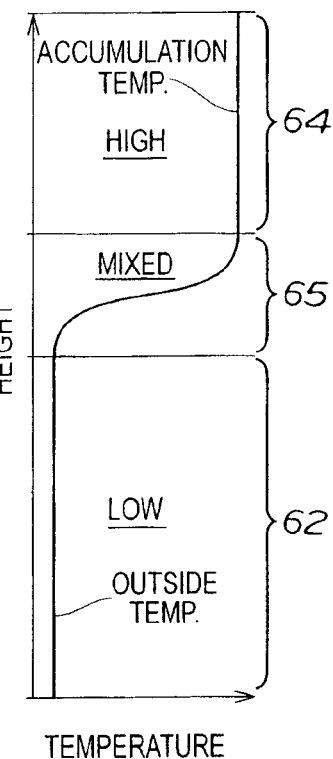
FIG. 6B is a graph showing a temperature distribution of the fluid held within a fluid circulation tube of the heat accumulator.

In this instance, because the engine cooling water held within the fluid circulation tube 15 is held out of contact with the heat accumulating medium 24, it will undergo natural convection and eventually develops temperature stratification in which a body of the engine cooling water is arranged into three horizontal layers 62, 65, 64 of different temperatures, as shown in FIGS. 6A and 6B. FIG. 6B is a graph showing a temperature distribution of the engine cooling water held inside the fluid circulation tube 15 as viewed in a lengthwise direction of the fluid circulation tube 15. The top layer 64 is a high temperature layer having a temperature (heat-accumulating temperature) substantially equal to the internal temperature of the inner vessel 31. The bottom layer 62 is a low temperature layer having a temperature substantially equal to the outside temperature and lower than the internal temperature of the inner vessel 31. The intermediate layer 65 disposed between the top and bottom layers 64 and 62 is a mixed layer having an average temperature substantially intermediate between the temperature of the top layer 64 (i.e., internal temperature of the inner vessel 31) and the temperature of the bottom layer 62. By virtue of the temperature stratification developed in the engine cooling water held inside the fluid circulation tube 15, the engine cooling water remaining at a portion adjacent to the pipe joint unit 29 is kept at a substantially low temperature (outside temperature) and the amount of heat dissipation or leakage from the pipe joint unit can be limited to a very low level. Thus, the heat accumulator 10 has an improved heat-retention property. Reference numeral 63 shown in FIG. 6A denotes an interfacial boundary between the high-temperature top layer 64 and the intermediate mixed layer 65, and reference numeral 61 shown in FIG. 6A denotes an interfacial boundary between the intermediate mixed layer 65 and the low-temperature bottom layer 62.

In the illustrated embodiment, the heat-insulating layer (vacuum layer) 36 is provided on an outer peripheral surface of the fluid circulation tube 15 over the entire length of the fluid circulation tube 15. The invention should by no means be limited to the illustrated embodiment but may include a heat-insulating layer which is provided on an outer peripheral surface of the fluid circulation tube 15 over at least a longitudinal portion of the fluid circulation tube 15, which extends upwardly from the bottom wall of the thermally-insulated heat storage vessel 12 and contains the low-temperature bottom layer 62 and the intermediate mixed layer 65. In the latter case, heat dissipation or leakage from a portion including the pipe joint unit 29 can be also limited to a very low level due to a low-temperature bottom layer formed by temperature stratification developed inside the fluid circulation tube 15.

When the engine 52 (FIG. 4) is restated, the engine cooling water is driven by the pump 51 to circulate through the circuit 50, and the heat accumulator 10 operates to perform a heat-releasing operation in which heat accumulated in the heat-accumulating medium 24 is transferred to the engine cooling water to thereby warm up the engine cooling water. The thus warmed engine cooling water is supplied to the heater core 53 and thence to the engine 52, thereby improving the heating performance and engine warm-up performance of the circuit 50.

Figure 7:
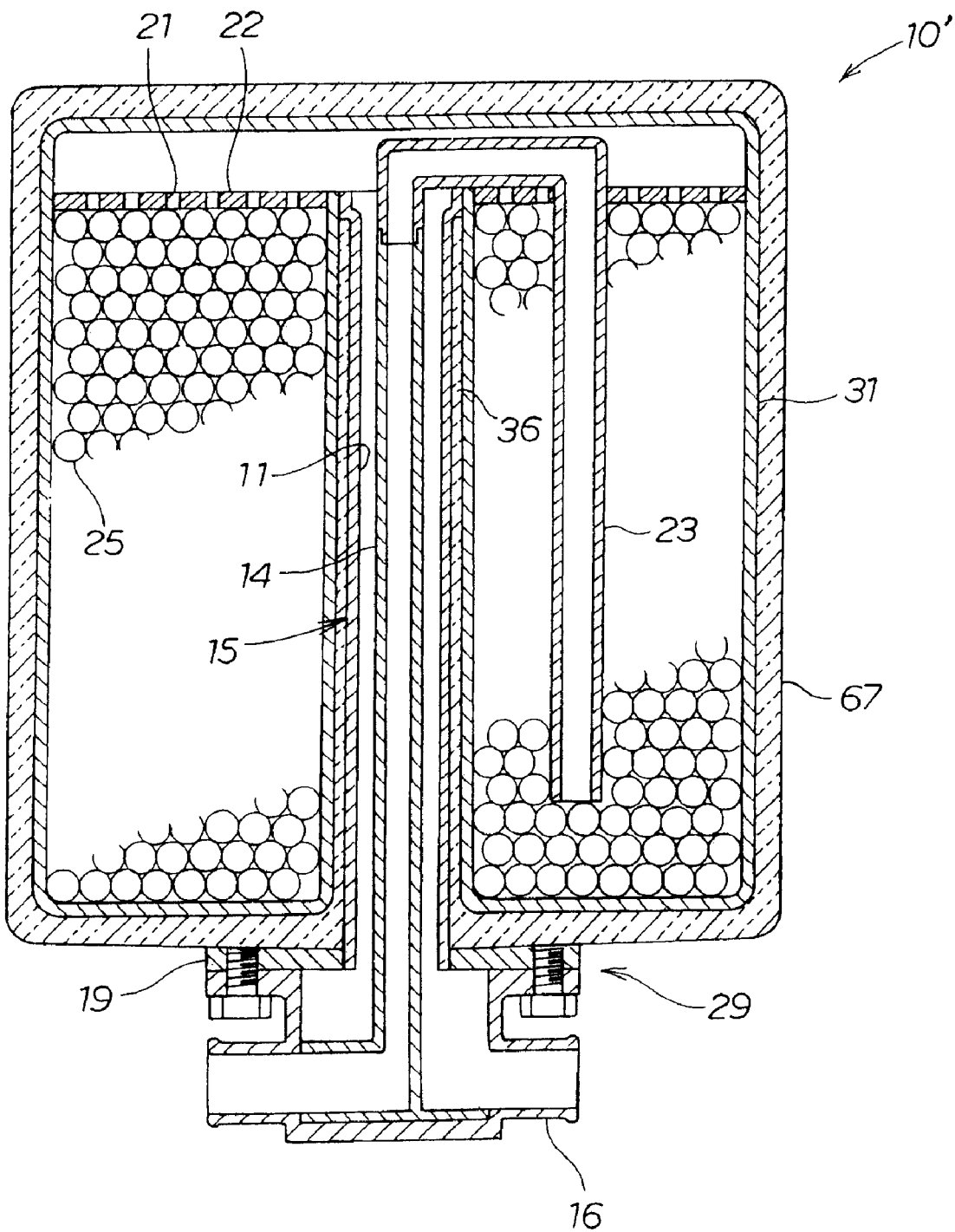
FIG. 7 is a vertical cross-section of a heat accumulator according to a second embodiment of the present invention.
Figure 8:
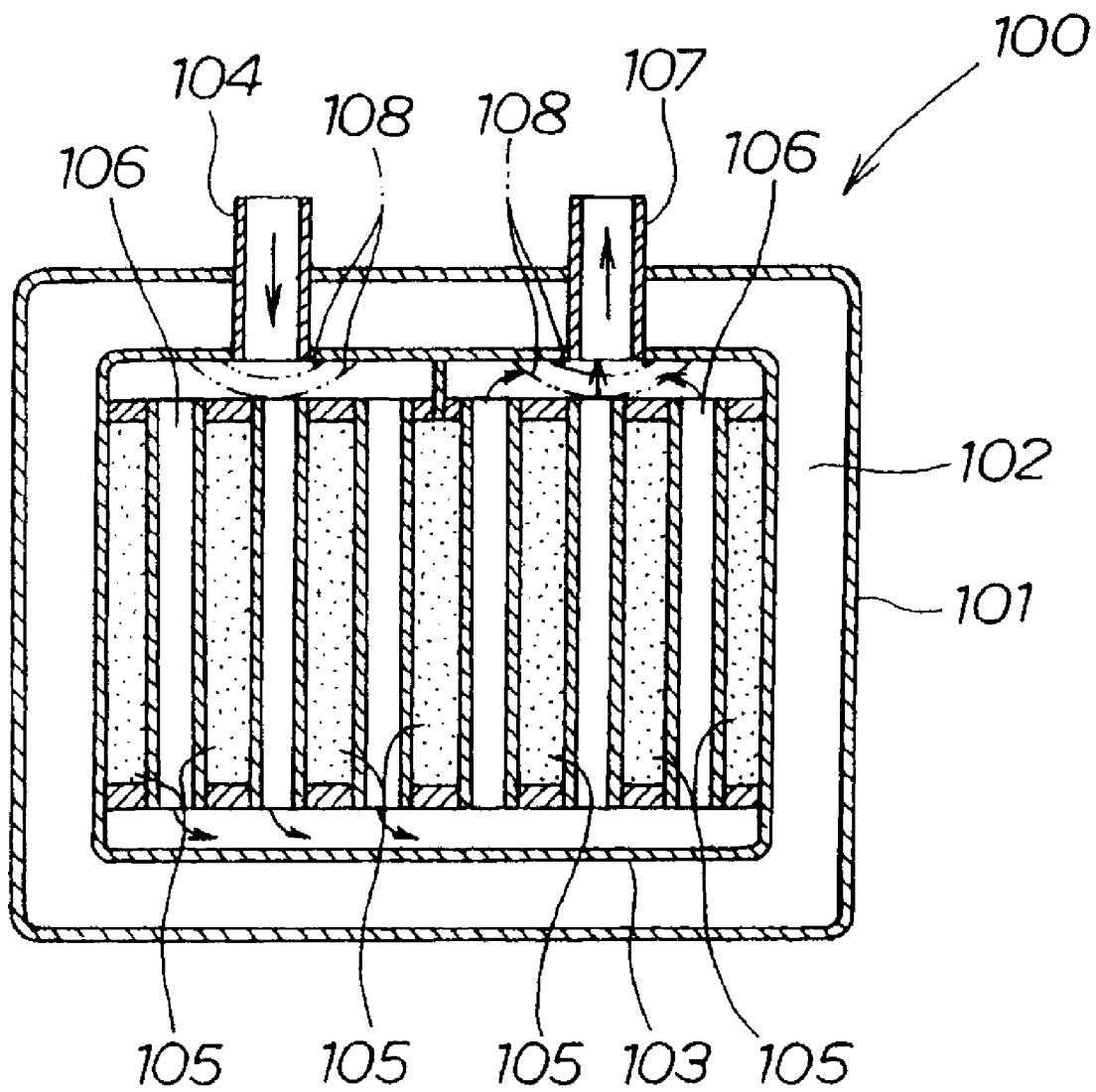
FIG. 8 is a vertical cross-sectional view of a conventional heat accumulator.

FIG. 7 shows a heat accumulator 10' according to a second embodiment of the present invention. The heat accumulator 10' differs from the heat accumulator 10 of the first embodiment shown in FIG. 2 only in that a thermally-insulated heat storage vessel 31 of single wall structure is covered with a layer 67 of heat-insulating material, and a fluid circulation tube 15 of double tube structure is covered with a heat-insulating layer 36 over the entire length thereof. The heat-insulating layer 36 which is formed by a layer of heat-insulating material may be replaced by a vacuum layer provided in the case of the heat insulator 10 of the first embodiment. As an alternative, the heat-insulating layer 67 may be replaced with a vacuum layer provided in the heat insulator 10 of the first embodiment.

Although the invention is embodied in the vehicular engine cooling water circulation system or circuit 50 (FIG. 4), it can be also applied to a hot water heat accumulator for household use or a heat accumulating tank for household use.

Obviously, various minor changes and modifications of the present invention are possible in the light of the above teaching. It is therefore to be understood that within the scope of the appended claims the invention may be practiced otherwise than as specifically described.

What is claimed is:

1. A heat accumulator, comprising:
   a thermally insulated heat storage vessel having a top wall, a bottom wall and an opening formed in the bottom wall;
   a quantity of heat accumulating medium arranged within the vessel;
   a fluid circulation tube of double tube structure inserted from the opening of the bottom wall into the vessel and extending vertically upward toward the top wall of the vessel for introducing a fluid into the vessel and discharging the fluid out of the vessel; and
   a heat-insulating layer provided on an outer peripheral surface of the fluid circulation tube and extending over at least a longitudinal portion of the fluid circulation tube extending from the bottom wall of the vessel in an upward direction to a predetermined height of the vessel;
   wherein the heat-insulating layer extends over an entire length of the fluid circulation tube.

2. The heat accumulator according to claim 1, wherein the heat-insulating layer comprises a vacuum layer provided between the outer peripheral surface of the fluid circulation tube and a hollow cylindrical inner wall of the vessel extending from the bottom wall toward the top wall of the vessel.

3. The heat accumulator according to claim 1, wherein the heat-insulating layer comprises a layer of heat-insulating material.

4. The heat accumulator according to claim 1, further comprising a support member mounted to connect the fluid circulation tube to the vessel.

5. The heat accumulator according to claim 4, wherein the support member is mounted to connect an upper end of the fluid circulation tube to the vessel.

6. The heat accumulator according to claim 1, wherein the heat accumulating medium is received within capsules.

7. The heat accumulator according to claim 6, wherein the capsules are spherical.

8. The heat accumulator according to claim 1, wherein the heat accumulating medium comprises a latent heat accumulating material selected from the group consisting of paraffin, sodium acetate trihydrate and erythritol, and the fluid is introduced via the fluid circulation tube to the heat accumulating medium, flows through the heat accumulating medium, and is discharged from the vessel via the fluid circulation tube.

9. The heat accumulator according to claim 8, wherein a heat transfer occurs between the fluid and the heat accumulating medium as the fluid flows through the heat accumulating medium.

10. A heat accumulator, comprising:
    a thermally insulated heat storage vessel having a top wall, a bottom wall and an opening formed in the bottom wall;
    a quantity of heat accumulating medium arranged within the vessel;
    a fluid circulation tube of double tube structure inserted from the opening of the bottom wall into the vessel and extending vertically upward toward the top wall of the vessel for introducing a fluid into the vessel and discharging the fluid out of the vessel; and
    a heat-insulating layer provided on an outer peripheral surface of the fluid circulation tube and extending over at least a longitudinal portion of the fluid circulation tube extending from the bottom wall of the vessel in an upward direction to a predetermined height of the vessel;
    wherein the heat accumulator is operable to perform a heat-retaining operation in which the heat accumulating medium releases heat to the fluid to thereby keep an internal temperature of the vessel at a constant value, wherein during the heat-retaining operation of the heat accumulator, the fluid circulation tube provided with the heat-insulating layer is capable of forming temperature stratification in which a body of the fluid held within the fluid circulation tube is arranged into three horizontal layers of different temperatures, the three horizontal layers consisting of a top layer of a first temperature which is substantially equal to the internal temperature of the vessel, a bottom layer which is lower than the first temperature and substantially equal to the outside temperature, and an intermediate mixed layer disposed between the top and bottom layers and having an average temperature which is intermediate between the first and second temperatures, and wherein said longitudinal portion of the fluid circulation tube provided with the heat-insulating layer contains only the bottom layer and the intermediate mixed layer.

11. A heat accumulator, comprising:
a thermally insulated heat storage vessel having a top wall, a bottom wall and an opening formed in the bottom wall;
a quantity of heat accumulating medium arranged within the vessel;
a fluid circulation tube of double tube structure inserted from the opening of the bottom wall into the vessel and extending vertically upward toward the top wall of the vessel for introducing a fluid into the vessel and discharging the fluid out of the vessel;
a heat-insulating layer provided on an outer peripheral surface of the fluid circulation tube and extending over at least a longitudinal portion of the fluid circulation tube extending from the bottom wall of the vessel in an upward direction to a predetermined height of the vessel; and,
a support member mounted to connect the fluid circulation tube to the vessel;
wherein the support member has an upper surface facing the top wall of the vessel, a lower surface facing the heat accumulating medium, and a number of through-holes extending between the upper and lower surfaces and held in fluid communication with the fluid circulation tube, wherein the fluid circulation tube of double tube structure includes an inner tube, and further comprising an extension tube extending from an upper end of the inner tube toward the bottom wall of the vessel across a thickness of the support member.

12. The heat accumulator according to claim 11, wherein the heat accumulating medium is contained in spherical capsules having an outside diameter larger than an inside diameter of the through-holes of the support member and smaller than inside diameters of the inner tube of the fluid circulation tube and the extension tube.

* * * * *